United States Patent

[11] 3,549,798

[72] Inventor James E. Young
Pittsford, N.Y.

[21] Appl. No. 654,492
[22] Filed July 19, 1967
[45] Patented Dec. 22, 1970
[73] Assignee Xerox Corporation
Rochester, N.Y.
a corporation of New York

[54] CONTINUOUS TONE FACSIMILE RECORDER
3 Claims, 5 Drawing Figs.

[52] U.S. Cl. 178/6.6, 331/66, 331/113, 331/144, 331/181; 332/1, 332/16
[51] Int. Cl. H04n 1/30
[50] Field of Search 332/1, 16, (Inquired); 331/66, 113, 144, 181, (Inquired); 178/6.6B, 6.7, 6.6, (Inquired); 179/15AB

[56] References Cited

UNITED STATES PATENTS

| | | | |
|---|---|---|---|
| 2,060,778 | 11/1936 | Finch | 178/6.6B |
| 2,112,010 | 3/1938 | Brimberg | 178/6.6B |
| 2,378,581 | 6/1945 | Roberts | 332/1 |
| 3,197,588 | 7/1965 | Ernst | 178/6.6B |
| 3,268,232 | 8/1966 | Grieber | 331/66 |
| 3,275,948 | 9/1966 | Rosenbusch | 331/181 |
| 3,149,201 | 9/1964 | Huber | 178/6.6A |

*Primary Examiner*—Robert L. Griffin
*Assistant Examiner*—Joseph A. Orsino, Jr.
*Attorneys*— Ronald Zibelli, James J. Ralabate and Norman E. Schrader

ABSTRACT: Facsimile recording apparatus for producing continuous tone images by depositing uniform size marks at varying intervals on a recording surface wherein received amplitude modulated (AM) signals are converted to frequency modulated (FM) signals, to establish spacing between the uniform marks, in a first embodiment by applying the AM signal to a variable inductor in a Colpitts oscillator and in a second embodiment by applying the AM signal to a light source to vary the resistance of a light sensitive resistor in a freerunning multivibrator.

INVENTOR.
JAMES E. YOUNG
BY Ronald Zibelli
ATTORNEYS

CONTINUOUS TONE FACSIMILE RECORDER

BACKGROUND OF THE INVENTION

This invention relates to recording apparatus and specifically to facsimile recorders for producing continuous tone reproductions from amplitude modulated video signals.

Television receiving systems produce continuous tone images from amplitude modulated video signals by scanning a fluorescent screen with a continuously moving electron beam whose intensity is modulated according to the amplitude of the transmitted video signal. This method of producing a continuous tone image is permissible because the fluorescent surface of the television screen is capable of producing a broad spectrum of tonal variations ranging from near white to near black. The fluorescent screen is limited, however, to use in television systems because it does not provide a permanent record of the transmitted information. On the other hand, many known recording surfaces capable of producing a permanent record are limited to two level tonal representations, e.g. black and white, an exception being systems using silver photographic film. Continuous tone images may be composed on two tone-level recording surfaces by depositing equally spaced marks of varying size on the recording surface with the eye of a viewer integrating the composite collection of marks to simulate a continuous tone image. The printing plate used in the newspaper industry to produce continuous tone pictures on news print is an example of this technique, which is known generally as halftone screening. A similar technique which shall be herein referred to as varying dot population creates continuous tone reproduction by depositing marks or dots of uniform size onto a two level recording surface at varying intervals.

Facsimile resorted to a dot population technique not only for producing continuous tone images but also to take advantage of certain benefits derived in transmitting frequency modulated rather than amplitude modulated signals. An example is the method set out in U.S. Pat. 1,848,839 to R. H. Ranger wherein a primary objective is the generation of frequency modulated pulses at a facsimile transmitter for transmission over telegraph and radio networks.

The present invention improves prior art two tone-level facsimile recorders, especially those that form an image by first creating a pattern of electrical charge on a recording surface and thereafter developing or making the image visible, e.g., by cascading a powder of charged particles, hereinafter referred to as toner, over the latent electrical image. The density of the toner adhering to the pattern of electrical charge is influenced by forces exerted by electric fields existing between areas on the recording surface of different voltage potential, i.e. areas within and without the latent electrical charge pattern. The electric fields are strongest at boundaries between areas of different potential and are weakest when these areas are most widely separated. This phenomenon causes uneven development of an image characterized by an excess of toner particles near the boundaries of solid tone image areas. Because of this characteristic, facsimile recorders of the foregoing type are normally restricted to producing copies of typewritten material and other two tone-level documents. The varying dot population technique employed by the present invention permits the production of continuous tone images and minimizes the problem of uneven development associated with the above recorders because large variations in electric field strength are avoided by forming an image from charged areas of uniform size separated from one another by areas of a different potential level.

The present facsimile recorder is designed to receive amplitude modulated (AM) rather than frequency modulated (FM) signals and uses novel and simplified means for converting the received AM signal into a corresponding FM signal. Operation on amplitude modulated signals enables transmission bandwidth to be conserved, increases the versatility of the recorder and simplifies the equipment needed in a facsimile system. AM signals can be transmitted over a single carrier frequency while the transmission of FM signals requires a comparatively broad bandwidth. Versatility in the recorder is obtained because facsimile scanning systems normally generate amplitude modulated signals in the process of scanning an original document and elaborate interface equipment is not required for an AM recorder to be compatible with many different scanners. Simplicity in a facsimile system is obtained because the AM signals produced by a scanner need not be converted to another signal form prior to transmission.

It is accordingly an object of the present invention to improve two-tone level facsimile records to permit the production of continuous tone images from amplitude modulated signals.

It is another object of the present invention to obtain improved continuous tone images in facsimile recorders of the type utilizing electrically charged recording surfaces to form an image.

It is another object of the present invention to improve electrical circuits for converting amplitude modulated signals to frequency modulated signals.

It is another object of the present invention to improve means in a facsimile recorder for converting amplitude modulated signals to frequency modulated signals.

It is another object to improve recording apparatus limited to two tone-level representation to permit creation of continuous tone images in response to amplitude modulated input signals using a varying dot population technique.

BRIEF SUMMARY OF THE INVENTION

The present application discloses apparatus for producing continuous tone images in two tone-level facsimile recorders using a varying dot population technique of image formation. The apparatus is adapted to operate on AM signals and by use of a variable control oscillator converts the amplitude modulated information to frequency modulated information. The FM signals produced by the invention are converted to a train of constant amplitude, constant width pulses which occur at a frequency corresponding to that of the generated FM signal. The pulses are in turn applied to the facsimile receiver writing means to deposit constant size marks or dots onto a recording surface at varying intervals corresponding to the tone of the image represented by an AM video signal.

A second embodiment of the invention employs a freerunning multivibrator to generate the pulse train applied to the recorder writing means. The received AM signal modulates the length of time period between pulses by varying the intensity of light directed on a light sensitive resistor in the multivibrator.

DESCRIPTION OF THE DRAWINGS

To aid in the understanding of the invention as well as to point out other objects and features of the invention, the following drawings are provided for use in conjunction with the description of the invention.

DESCRIPTION OF THE INVENTION

Figures 1, 2, 3A, 3B, 4:
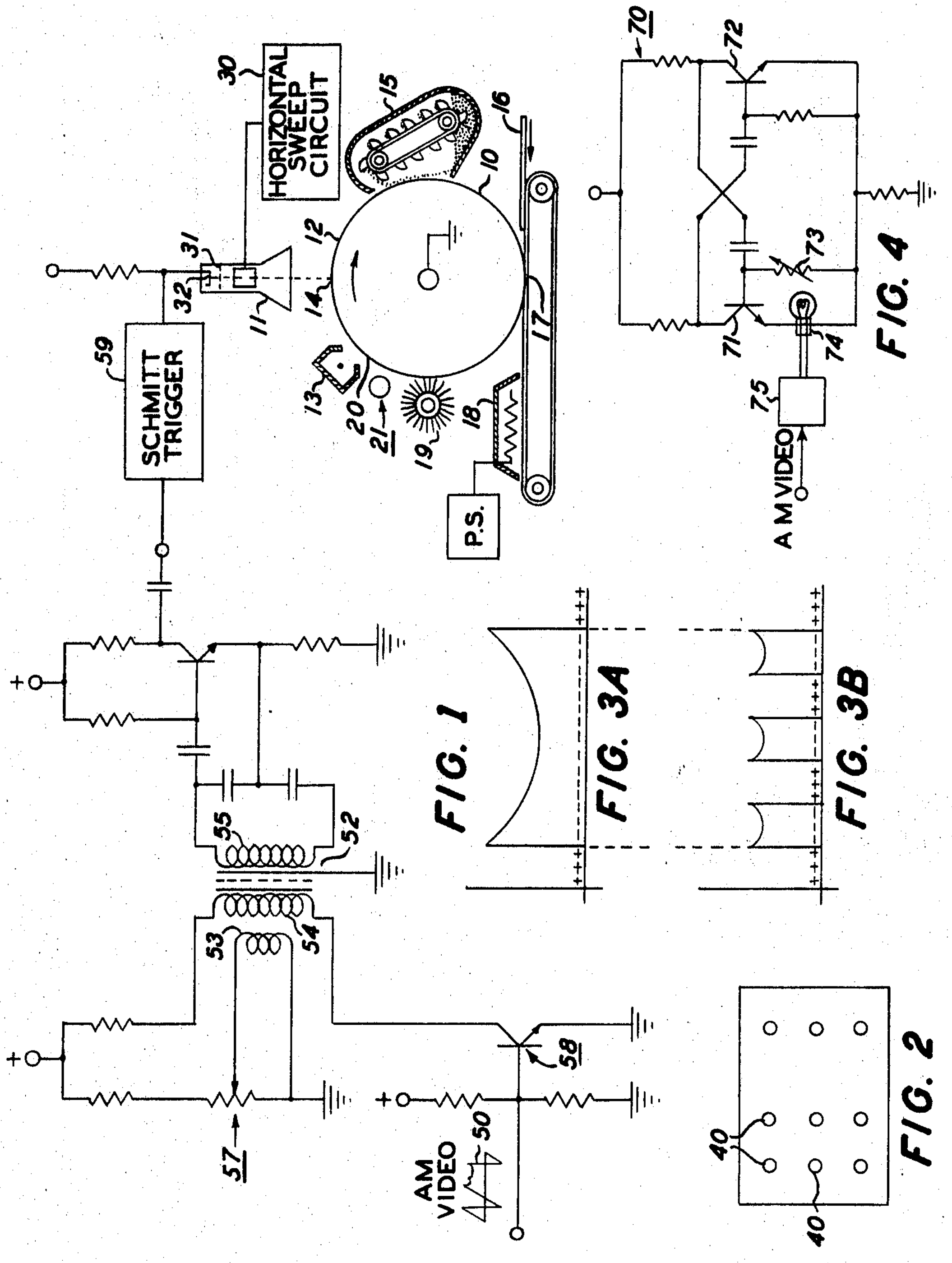
FIG. 1 is a schematic of one embodiment of the present invention shown in use with a xerographic recording apparatus.
FIG. 2 is an enlarged view of a section of a photoconductor having discrete areas of charge placed thereon in accordance with a varying dot population technique.
FIG. 3*a* and *b* are diagrammatic representations of the amplitude of electric fields created between areas of different charge on a recording surface.
FIG. 4 is a schematic diagram of a second embodiment of the present invention.

FIG. 1 illustrates the recorder with which the present invention will be explained. Basic elements of the recorder comprise drum 10 and cathode ray tube 11. The drum rotates at a constant speed and photoconductive material 12 on its periphery serves as the recording surface. Cathode ray tube 11

(CRT) serves as the writing means. The photoconductor material is capable of producing visible images using the xerographic process set forth in Mayo U.S. Pat. No. 3,062,109. A xerographic facsimile system using a recorder of this type is disclosed in U.S. Pat. No. 3,149,201, to C. L. Huber et al. Both patents are assigned to the assignee of the present application. Photoconductor 12 is charged to a uniform potential by corona discharge produced by corotron 13. Thereafter, the drum passes CRT 11 and its associated optical system (not shown) where light generated by the CRT sweeps the width of drum 10. Horizontal sweep circuit 30 applies an appropriate signal to a deflection electrode of the CRT to attain a constant sweep rate across the width of the drum. The drum areas struck by light assume a potential different from that initially deposited on the photoconductor by the corotron because the photoconductor becomes conductive in areas exposed to light and assumes the potential coupled to the drum (normally ground). Modulating the CRT beam on and off enables an electrical charge pattern to be scribed on the photoconductor. The pattern is created line by line as the drum proceeds past the CRT. The image is made visible or developed when the drum advances to development station 15 where toner particles are cascaded over the image. The toner particles adhere to the drum in areas having a charge differing from the charge on the toner particles.

When the charge placed on the drum by the corotron and the charge on the toner are substantially the same potential, the particles will adhere to the drum areas struck by light and be repelled in all other areas, thereby forming a visible image. Thereafter the developed image is transferred to copy sheet 16 by electric forces at transfer station 17 and fused to the paper by heat at station 18. The drum proceeds to a cleaning station where excess toner particles are removed by brush 19, then to lamp 21 where the photoconductor is discharged by flooding it with light and finally to corotron 13 where the drum is again charged. Thereafter the cycle is repeated for subsequent image formation.

Referring now to the CRT shown in FIG. 1, sweep circuit 30 supplies a sawtooth signal to the deflection electrode of the CRT to cause a constant sweep of light across the width of the drum. The signals generated by the present invention are applied either to control grid 31 or cathode 32 of the CRT in order to modulate the light impinging on the drum. For purposes of this presentation the signal is shown applied to the cathode.

The signal generated by the present invention comprises a series of pulses of substantially constant width and amplitude which occur at varying intervals of time depending upon the information fed to the recorder. The pulses either cut off or turn on the CRT electron beam depending upon the polarity and amplitude of the pulses. For simplicity, the system will be described as causing the electron beam to conduct when a pulse is applied to the CRT. The light generated by the CRT and directed onto the drum causes a change in the potential on the photoconductive surface of the drum. For illustrative purposes, the initial charge placed on the drum by corotron 13 is positive and the charge on the toner particles is positive, hence, toner particles will adhere to the low potential (normally ground) areas on the drum created by the spot of light. Obviously a system can be readily devised wherein the image to be developed lies in the drum areas where light has not been directed. In such a case, the pulse generated by the invention turns off the light during the information period, thereby selectively erasing the charge on the drum to form the electrical image in the nonerased areas. It is evident that even this technique may be varied to create either negative or positive images and/or by inducing positive or negative potential levels on the photoconductor and toner particles.

FIG. 2 illustrates a section of the drum (enlarged several times) which has had a charge pattern scribed on it. The charge on the drum is at some predetermined positive potential level and the spots or marks 40 represent points which have been struck by light from the CRT. These spots assume a substantially zero potential (when the photoconductor of the drum is grounded rather than held to some other potential) because the photoconductor is rendered conductive in areas struck by light. Cascading positively charged toner particles over the drum results in particles adhering to the drum in areas of zero potential while being repelled in areas of positive potential. The density of the spots in the various areas is a function of the tone of the corresponding area on a document being reproduced. The areas where the spots are closely spaced represent dark tones and where widely spaced light tones and the variations of spacing between these extremes give rise to a continuous tone reproduction. The development of the image, i.e. the distribution of toner particles in the areas of zero potential, is substantially even because large variations in electric field strength causing uneven development are eliminated. Each discrete spot is separated by an area of different potential, thus no large varying field effects are present to cause an uneven development of an solid area image. It must be kept in mind, however, that although the toner is evenly distributed on the drum areas struck by light that the spacing between these areas varies causing the eye of a viewer to perceive the variations in spot density as changes in tone.

FIGS. *3a* and *3b* are diagrammatic representations of the amplitude of electric fields existing between areas on the photoconductor retaining different charge levels. FIG. 3 (*a* ) illustrates the variation in field strength existing when charge is distributed over relative large areas and FIG. *3b* when charge is distributed according to a varying dot population technique. During development of an image, toner particles are attracted to the areas of the photoconductor having charge different from that of the toner but the particles are also attracted to the photoconductor by the above mentioned electric fields. The particles have greatest tendency to adhere to the photoconductor at boundaries between charges of different potential level because the forces exerted by the fields are strongest in these areas. A field distribution as shown in FIG. *3a* results in an uneven development of an image because of the comparatively large variation in the electric field strength. A charge pattern laid down using the varying dot population technique results in an electric field distribution as shown in FIG. *3b* which permits substantially even distribution of toner particles over the surface of the photoconductor. FIGS. *3a* and *b* do not show the electric fields existing over the areas of positive potential because the present discussion began with the assumption that development is to take place in the areas of ground potential (represented by minus signs in FIGS. *3a* and *b*.

Resolution of 180 lines per inch, which is acceptable in many facsimile systems, is readily obtained in the present invention by using a CRT spot size of .002 inches (2 mils). This permits 250 marks or spots per inch to be placed on the photoconductor, assuming that the minimum spacing between marks is equal to the spot size. CRT and optical systems are obtainable with spot sizes as small as .0000025 inches (2.5 microns). CRT and optical systems capable of producing a spot size in the range of one mil are readily available, thus permitting a resolution of 500 lines per inch and 500 marks per inch on a recording surface. Again, these figures are derived by requiring the minimum distance between spots to be equal to the size of the spot. The spacing between lines is held constant and preferably is the same as the minimum spacing between spots in a line.

For effective development, the size of the toner particles should have a diameter of at least one-tenth that of the spot size produced by the CRT. For a spot size of one mil toner particle size should therefor be at least one-tenth of a mil. Particle sizes in the range of 10 to 20 microns are readily available and of course are more desirable for use in the development of images.

Returning to the discussion of FIG. 1, there is shown an embodiment of the present invention for converting AM signals to FM signals. The amplitude of video signal 50, generated by a facsimile scanner, represents the tone of the image to be reproduced. The video signal is shown directly coupled to the base electrode of transistor 58 but can be applied thereto through an amplifying and shaping network. It should also be understood that the present invention can be employed with facsimile recorders that receive video signals in a form other than amplitude modulated signals. Of course, an intermediate circuit for converting these signals to amplitude modulated form would be required to permit the present invention to be used.

The collector electrode of transistor 58 is coupled to variable inductor 52 having control winding 54, bias winding 53 and signal winding 55. The signal winding is used as a variable inductor in the tank circuit of a Colpitts type oscillator. The oscillator generates a sine wave signal output whose frequency is varied by varying the inductance in the tank circuit. The variable inductor used in the circuit was manufactured by CGS Laboratories of Wilton, Connecticut under the trade name of Increductor. The variable inductor works like a saturable reactor but is capable of operating at much higher frequencies. High frequency and wide range operation is made possible by utilizing cores formed at least in part of ferrite materials. The bias winding of the variable inductor permits operation of the unit at varying points on a magnetization curve. Bias network 57 provides a current flow through the bias winding to establish a particular operating point on the magnetization curve. The inductance of the signal winding, the variable inductor in the tank circuit, varies as a function of the current in the control winding. The signal winding has maximum inductance when the control winding current is zero. As the control winding current increases, the permeability of the ferrite core material is progressively reduced, thus reducing the inductance of the signal winding. Transformer action of the unit is eliminated by forming the signal winding in two counterconnecting parts to prevent coupling between the signal and control windings. Electrostatic shielding is also used to prevent transformer action. A change in inductance ranging approximately from 8.5 millihenries (mHO) to 3,000 (mH) was attained using a Increductor 38 DB 1 variable inductor.

The frequency of the oscillator is shifted by varying the current flow through the control winding in proportion to the amplitude of the video signal. The control winding is coupled to an appropriate potential source, a current limiting resistor and transistor 58. An appropriate bias network is provided for the transitor. Current flow through the control winding is controlled by the voltage applied to the base electrode of the transistor. The video signal (directly or after passing a shaping circuit) is applied to the base electrode of the transistor causing a proportional change in current flow in the control winding. The change in current is reflected as a proportional change in inductance in the signal winding which in turn causes a change in oscillator frequency proportional to the amplitude of the video signal. As mentioned earlier, the maximum frequency of the oscillator, which determines the darkest tone to be reproduced, may be established by requiring that the spacing between spots placed on the photoconductor be equal to the size of the spot itself. The minimum frequency, which represents the lightest tone to be reproduced, is dependent upon the capability of the oscillator and the needs of the designer as to the lightest image tone he is willing to accept. Frequency variations ranging substantially from 3 to 250 kc. are readily attained for producing the various tonal representations.

The output of the oscillator may be applied directly to the cathode of the CRT to modulate the electron beam; however, it is preferable to shape the oscillator signal prior to applying it to the CRT. The oscillator output is applied to Schmitt trigger 59 for generation of constant amplitude, constant width pulses occurring at the frequency of the oscillator output signal. These pulses are in turn applied to the CRT. The frequency of the pulses corresponds to the frequency of the oscillator because the Schmitt trigger generates a pulse at the positive crossover point of each cycle of the sinusoidal signal generated by the oscillator. A monostable multivibrator may be used to generate the pulses rather than the Schmitt trigger. The resultant modulation of light enables the desired electrical charge pattern to be formed on the photoconductor surface of the drum in the manner described above.

A second embodiment of the present invention is shown in FIG. 4. Freerunning multivibrator 70 is set to generate a constantly occurring pulse train. The frequency of the pulses is controlled by varying the resistance in the feedback path between transistors 71 and 72. Variations in the value of the resistor 73 causes a change in the time constant of the feedback path between transistors and therefore the time between the generation of the individual pulses. The resistor is a light sensitive resistor and is positioned adjacent to light source 74. The amplitude modulated video signal is applied to this light source through amplifying and shaping network 75 to vary the intensity of the light in proportion to the amplitude of the video signal. Variation in light intensity causes a like change in the value of the resistor and in turn the frequency of the pulses generated by the multivibrator. These pulses are then applied to the CRT in the manner described above.

Having thus described the invention it will be clear that many modifications and deviations therefrom may now be readily devised by those skilled in the art. The present invention has application in facsimile systems using different writing means and recording surfaces, e.g., the invention applies equally to a system wherein an image is formed by depositing with an electrode an electrostatic charge on a dielectric surface. In addition, the invention is not limited to facsimile recorders that form images by creating an electrical charge pattern of the image but also applies to any recorder which is capable of producing discrete marks or dots on a recording surface such as a hammer stylus marking on carbon paper or an ink pen marking on paper. Such modifications and deviations will come within the scope of this invention. Consequently, the invention herein disclosed is to be construed broadly and limited only by the spirit and scope of the appended claims.

I claim:

1. Facsimile recording apparatus to produce continuous tone recordings in accordance with received amplitude modulated signals representative of an image to be reproduced comprising:

signal generating means to produce pulses of constant width and amplitude at a rate proportional to the amplitude of said amplitude modulated signals, said signal generating means comprising an oscillator to generate a sine wave signal, frequency control means coupled to said oscillator to vary the frequency of said sine wave signal in proportion to the amplitude of said amplitude modulated signals, and a pulse generator coupled to said oscillator to produce pulses of constant width and constant amplitude at a rate corresponding to the frequency of said sine wave signals;

a recording surface capable of producing at least two levels of tone representation; and writing means coupled to said signal generating means to produce uniform size marks on said recording surface in response to said pulses, said marks being scribed in uniformly spaced lines with the spacing between marks in a line varying in proportion to the rate of occurrence of said pulses.

2. Facsimile recording apparatus according to claim 1 wherein said oscillator comprises a Collpits oscillator having an inductor-capacitor tank circuit and wherein said frequency control means comprises the bias and control windings of a variable inductor, the signal winding of said variable inductor serving as the inductor in said oscillator tank circuit, a bias network coupled to the bias winding of said variable inductor to establish an operating point on the magnetization curve of the variable inductor, and means coupled to said control winding to vary the current therethrough in proportion to the amplitude of said amplitude modulated signals.

3. Facsimile recording apparatus according to claim 2 wherein said recording surface comprises a charged photoconductive material, and wherein said writing means comprises a cathode ray tube, the light beam produced by said cathode ray tube modulating the charge on said photoconductive material enabling a desired electrical charge pattern to be formed thereon.